(12) United States Patent  
Schumacher (10) Patent No.: US 7,073,972 B1
(45) Date of Patent: Jul. 11, 2006

(54) CONVERSION PLATE WITH SCHUR-LOCK PIN MECHANISM

(76) Inventor: Michael S. Schumacher, 1179 77th St., Chetek, WI (US) 54728

(*) Notice: Subject to any disclaimer, the term of this patent is extended or adjusted under 35 U.S.C. 154(b) by 130 days.

(21) Appl. No.: 10/835,110

(22) Filed: Apr. 30, 2004

(51) Int. Cl.
B25G 3/08 (2006.01)

(52) U.S. Cl. .................................................. 403/382
(58) Field of Classification Search ............... 403/321, 403/322.1, 322.3, 323, 322.4, 61, 110, 116, 403/374.5, 107; 37/468; 172/272, 817; 414/723, 724
See application file for complete search history.

(56) References Cited

U.S. PATENT DOCUMENTS

| | | | |
|---|---|---|---|
| 3,220,487 A | 11/1965 | Pitch | |
| 3,512,665 A * | 5/1970 | Westendorf | 414/723 |
| 3,794,195 A | 2/1974 | Clevenger et al. | |
| 3,964,622 A | 6/1976 | Blair et al. | |
| 4,018,104 A * | 4/1977 | Bland et al. | 74/531 |
| 4,085,856 A * | 4/1978 | Westendorf | 414/723 |
| 4,436,477 A | 3/1984 | Lenertz et al. | |
| 4,545,720 A | 10/1985 | Cochran et al. | |
| 4,812,103 A * | 3/1989 | Cochran et al. | 414/723 |
| 4,846,624 A | 7/1989 | Hohn | |
| 4,911,348 A * | 3/1990 | Rasor et al. | 224/321 |
| 4,986,722 A | 1/1991 | Kaczmarczyk et al. | |
| 5,078,569 A | 1/1992 | Cook | |
| 5,098,252 A | 3/1992 | Sheesley et al. | |
| 5,685,689 A | 11/1997 | Schneider et al. | |
| 5,836,734 A | 11/1998 | Doering | |
| 6,238,130 B1 * | 5/2001 | Youngers | 403/322.4 |
| 6,371,683 B1 | 4/2002 | Draney et al. | |
| 6,572,195 B1 * | 6/2003 | Lee | 297/411.37 |
| 6,644,885 B1 | 11/2003 | Dam-Rasmussen | |

* cited by examiner

Primary Examiner—Daniel P. Stodola
Assistant Examiner—Joshua T. Kennedy
(74) Attorney, Agent, or Firm—Tipton L. Randall (57) ABSTRACT

A locking pin system for connecting a conversion plate adaptor with a universal quick attach tool plate. Additionally there is a conversion plate adaptor with a manual locking pin system for attaching the conversion plate adaptor to a universal, quick attach, tool plate and to loader arms of a powered vehicle. The locking pin system provides a simple, easy to use, mechanism for locking and unlocking the plate adaptor to a universal tool plate.

21 Claims, 6 Drawing Sheets

CONVERSION PLATE WITH SCHUR-LOCK PIN MECHANISM

CROSS-REFERENCE TO RELATED APPLICATIONS, IF ANY

Not applicable.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a conversion plate adaptor with a locking pin mechanism for interconnecting a universal quick attach tool plate to the loader arms of an hydraulically powered structure operated by a powered vehicle.

2. Background Information

Various powered vehicles fitted with hydraulically operated loader arms are used in a wide variety of applications. In order to perform specific functions, various types of attachment tools are mounted to the loader arms at the front end of the powered vehicle. Typically, a coupling device is used to interconnect the loader arms of the powered vehicle to the attachment tool. It is necessary to provide a coupling device which securely interconnects the loader arms of the powered vehicle to the attachment tool. It is also highly desirable to provide a coupling device which allows a user to quickly and securely substitute one attachment tool for another.

At present, the coupling device is pivotally mounted to the loader arms of the powered vehicle by pivot pins. Then, the powered vehicle is interconnected to the attachment tool necessary to perform the task to be undertaken. In order to interconnect the coupling device to the desired attachment tool, the loader arms of the powered vehicle are such that the coupling device engages mounting shoes extending from the rearward surface of the attachment. The attachment tool is then manipulated in order to align one or more holes on the back thereof with corresponding holes extending through the coupling device. Pins are manually inserted through the coupling device and the attachment tool in order to interconnect the attachment tool to the powered vehicle.

While manual insertion of pins to interconnect the attachment tool to the powered vehicle is functional, such a manual insertion technique is often difficult and time consuming. The time involved in substituting one attachment tool for another results in significant down time for the powered vehicle which, in turn, increases the cost of operating the powered vehicle and reduces the productivity thereof.

In an alternative technique, the coupling device includes vertical pins which are inserted into corresponding openings in the attachment tool which are spaced an industry standard distance apart. A complex arrangement of linkages allow a user to insert and remove the vertical pins from their corresponding openings. In addition to the expense associated with providing such linkages, these types of linkages tend to become packed with debris during use of the powered vehicle rendering them inoperative thereafter.

Inventions, including coupling devices for attaching various implements to power-operated arms or booms of powered vehicles, for which patents have been granted include the following.

Pilch, in U.S. Pat. No. 3,220,487, describes a backhoe mounting assembly that includes a pair of threaded bolts that are pivotally secured to the frame of the machine. The bolts are each connected to a support bracket carrying a lug on the lower end and wedge portions that contact members. The brackets each include lugs forming sockets for receiving the bolts, with threaded nuts holding each bolt within a socket, as shown in FIG. 4.

In U.S. Pat. No. 3,794,195, Clevenger et al. disclose a quick-attaching mechanism for coupling a material handling implement to the remote end of a boom structure extending from a loader. The quick attaching mechanism includes a mounting lip or cavity formed along an upper rear portion of the material handling implement. The lip or cavity receives an upper edge of a mounting plate that is pivotally mounted to the remote end of the boom structure. In addition, an over-center wedging mechanism (FIGS. 7–9) is provided with the mount plate for engagement with a pair of hook members that are fixed to the material handling implement and extend rearwardly therefrom, through openings within the mounting plate.

Blair et al., in U.S. Pat. No. 3,964,622, describe a loading arm mounting bracket that includes an upwardly open upper slot and a forwardly open lower slot, respectively adapted to receive corresponding upper and lower pins of an implement bracket. A spring loaded lock plate is selectively received between the lower pin and slot-adjacent retaining plates, thereby removably securing the lower pin in the lower slot and trapping the upper pin in the upper slot. Manual release is obtained by pulling on a handle attached to the locking plate.

In U.S. Pat. No. 4,085,856, Westendorf discloses a quick attach apparatus for end loaders or the like such as tractor loaders. The tractor loader includes a pair of booms pivotally secured at one end thereof to the tractor. A hydraulic cylinder is pivotally secured to each of the booms and is positioned over the other end thereof. A hook-up bracket is pivotally secured to the other end of each boom and the hydraulic cylinder, the bracket including a channel-shaped portion extending forwardly therefrom. Each of the various attachments for the loader, such as buckets, forks, blades, etc. have a pair of channel-shaped pockets secured to the rearward end thereof which receive a hook-up bracket therein. A locking apparatus is provided on each of the brackets to detachably maintain the hook-up brackets in their respective pockets. The locking apparatus includes means for yieldably maintaining the locking apparatus in an unlocked condition and means for automatically locking the locking apparatus after the hook-up bracket has been properly received within its respective pockets.

U.S. Pat. No. 4,436,477 by Lenertz et al. describe a quick attachment carrier assembly for releasably connecting an attachment to a front end loader. The assembly comprises a pair of carriers with top and bottom notches therein adapted to receive transverse pins on the implement. Pivotal hooks are provided on the carriers for engagement with the pins for interconnecting the implement to the loader. The latch hooks are preferably secured together and controlled in common by means of a single lever and plunger which permit positive locking of both hooks in either the latched or unlatched positions.

Cochran et al., in U.S. Pat. No. 4,545,720, describe a quick coupler assembly for attaching a material handling bucket or the like to the free ends of lift arms extending from a loader. The quick coupler assembly includes an elongated cross member having hitch brackets on its opposite ends. Each hitch bracket includes an end which is received against the underside of an upper attachment member on the rear wall of the bucket near the top edge thereof. The opposite end of the hitch bracket is configured for engagement against a lower inclined ramp extending along the bottom rear edge of the bucket. The coupler assembly further includes an over-center locking mechanism consisting of a pivotal handle and link connected to a shaft with a wedge on the lower end of the shaft. The shaft and wedge are movable in response to over-center movement of the handle and link, such that the wedge moves downwardly and passes through openings in a lower hitch bracket attachment member and the lower inclined bucket ramp for locking the quick coupler assembly to the bucket. After the operator has located the bucket in a hanging position on the quick coupler assembly, the assembly is rotated rearwardly such that an end of the handle is pushed against a stop member. As a result, the handle and link are pushed over center, thereby forcing the wedge downwardly through the openings in the attaching members between the hitch bracket and bucket for securely attaching the bucket to the coupler assembly.

In U.S. Pat. No. 4,812,103, Cochran et al. disclose another improved coupling assembly enabling a bucket to be selectively coupled to and uncoupled from a front-end loader with lifting and tilting means. A female coupling structure is integral with the bucket. A back plate of the female coupling structure bears against a front plate of a male coupling structure with no gap between such plates. An upper flange on the front plate bears upwardly against an upper flange on the back plate. Means are provided to latch the male coupling structure releasably to the female coupling structure. Vertical play between the male coupling structure and the female coupling structure is limited precisely to a specified gap between and adjustable member on the male coupling structure and a fixed block on the female coupling structure.

Hohn, in U.S. Pat. No. 4,846,624, describes an automatic, adjustable, quick attaching loader mechanism for fastening load carrying implements to the loader arms of end loading tractors. This mechanism provides two slots for receiving transverse positioning pins located in standard positions on the rear of various type of load bearing implements, such as forks or scoops. A pivoting latch serves to lock the implement securely in position, while a slidable lock holds the pivot latch in position. While the security of some attaching mechanism of this type may become suspect after long and continuous use due to the enlargement of the lower slots from wear, an adjusting mechanism is provided for maintaining a secure relation between the slidable lock and the pivot latch, thereby enabling the attaching mechanism to maintain various load carrying implements in a securely locked position throughout the life of the attaching mechanism.

In U.S. Pat. No. 4,986,722, Kaczmarczyk et al. disclose a quick coupling structure which is selectively connectible to a loader attachment, which includes a spring-loaded latching pin located on the attachment and easily viewed from the operator station. A pin-contacting member located on the loader boom arm automatically releases the pin, allowing it to move to a locking position as the attachment is rocked about a pivotal axis by an attachment cylinder. An alternate interchangeable coupling structure is provided, which may be utilized on the attachment when a quick coupler is not needed. The pivot points for the attachment remain the same with either the quick coupler or the alternate coupling attached. An attachment holder utilized with the quick coupler may be eliminated when the alternate coupling structure is connected to the attachment.

Cook, in U.S. Pat. No. 5,078,569, describes a quick attaching mechanism for automatically fastening an implement to a boom assembly of a front-end loader. The quick attaching mechanism is designed to accommodate a broad range of lateral spacing between lift arms of the boom assembly and mounting structures on the implement to be attached thereto. The quick attaching mechanism includes a pair of male coupling structures carried at a forward end of the boom assembly, which are releasably fastened to female coupling structures on the implement. Each male coupling structure includes a fastening pin, which is automatically operated to releasably fasten the implement to the boom assembly.

In U.S. Pat. No. 5,098,252, Sheesley et al. disclose an adaptor mechanism for use with a skid steer loader, having an implement mounting plate configured in a first attachment configuration. The adaptor mechanism permits the attachment of an implement configured in a second implement attachment configuration to the skid steer loader. The adaptor mechanism includes a movable locking mechanism having hook members protruding perpendicularly therefrom for engagement with the over-center wedging mechanism in the implement mounting apparatus on the skid steer loader. A spring biases a locking mechanism toward a retracted position. However, engagement of the hook members by the skid steer loader over-center wedging mechanism overcomes the biasing force exerted by the spring to force the locking mechanism into engagement with the implement being mounted thereto.

Schneider et al., in U.S. Pat. No. 5,685,689, describe a quick attach system for removably attaching an implement, such as a bucket, to a front end loader. The system includes a quick attach assembly connected to the lift arms and tilt operators of the front end loader. A pair of alignment members mate with alignment recesses on the bucket, while a pair of spring-urged locking pins mate with a pair of brackets on the bucket. A common scissors-type pin retraction assembly is connected to the locking pins with a single release handle provided to move the pins between locked and release positions. The handle moves within a slot between, as the pins move between the locked and release positions. A detent is provided for holding the handle and the locking pins in the release position. The handle is automatically urged from the detent position by a locking member on the loader as the bucket is attached to the loader, thus allowing the pins to lock into'place in the bucket brackets.

In U.S. Pat. No. 5,836,734, Doering discloses a latching device for coupling a vehicle tool carrier with a variety of tools, such as a bucket. The device releasably secures the tool with the carrier once the carrier has been positioned with the tool. A detent mechanism is provided on the device to retain it in either its latched or unlatched position. A lost-motion connection is provided between the latching handle and latch pin to permit the link interconnecting the handle and pin to move to an over-center position when the device is in the latching configuration. A spring holds the link in its over-center position. The latch handle swings through an angle of approximately 70 degrees, as it moves between its latched and unlatched positions, to minimize interference with the carrier and tool structures and simplify activation by the operator from his seat.

Youngers, in U.S. Pat. No. 6,238,130, describes a coupling device for interconnecting an attachment tool to the loader arm of the skid steer. The coupling device includes handles which are pivotable between unlocking and locking positions. The handles control coupling pins which diverge from each other and which move between a retracted position and an extended position to capture the attachment tool on the coupling device. The operation of the handles and associated coupling pins are clearly illustrated in FIGS. 3 and 4.

In U.S. Pat. No. 6,371,683, Draney et al. disclose a coupler for a horizontal, directional drill for quickly and easily attaching and detaching a stake down assembly from the drill. The coupler includes a first coupler member and a second coupler member with matching angular front and rear ends so that the first member fits within the second member. A lever operated locking mechanism releasably locks the two coupler members together in attached relationship, illustrated in FIGS. 3–6.

Dam-Rasmussen, in U.S. Pat. No. 6,644,885, describes an implement coupling for a loading machine that includes a connection for mounting the implement coupling at an extreme end of a loading arm and for connection with an actuating arm of a hydraulic cylinder. The implement coupling comprises a coupling mechanism which couples the implement coupling with a complementary coupling mechanism of an implement, and a locking mechanism with a transverse, displaceable locking beam. A locking mechanism interacts with the complementary coupling of the implement, and may be displaced by spindles or hydraulic cylinders. The coupling mechanism includes upper fixed hook coupling parts, which grip around upper connecting pins on the implement, and lower, displacing hook coupling parts, which fix lower connecting pins of the implement when in contact with a contact surface on the implement coupling, the displacing coupling parts being connected with the locking beam.

Applicant has devised a conversion plate adaptor with a locking pin mechanism for attaching the conversion plate adaptor to the mounting blocks, or similar mounting elements, of an hydraulically powered structure operated by a powered vehicle.

SUMMARY OF THE INVENTION

The invention is directed to a locking pin system for connecting a conversion plate adaptor with a universal, quick attach, tool plate. The locking pin system includes a linear locking pin member moveably mounted within a vertical channel interior the conversion plate adaptor. The locking pin member is moveable between a retracted position exterior an aperture in a tool plate and an extended position interior an aperture in a tool plate. The locking pin member has a planar plate portion secured at an upper end thereof, exterior the vertical channel, with the plate portion oriented parallel with the pin member's longitudinal axis. Each plate portion has a threaded bolt member mounted perpendicular thereto. A planar, slotted upright member is secured at one end to the conversion plate adaptor adjacent the locking pin member and parallel with the pin member's longitudinal axis. The upright member has a vertical slot therein accepting the pin plate portion's threaded bolt member there through. A locking handle member includes a threaded fitting portion at one end thereof, with the threaded fitting portion engaging the locking pin member's threaded bolt member extending through the upright member's slot. Pivoting the threaded fitting with the handle member draws the pin member's plate portion into contact with the upright member, thereby locking the pin member at a selected position in the vertical channel.

Also included in the invention is a conversion plate adaptor with a manual locking pin mechanism for attaching the conversion plate adaptor to a universal quick attach tool plate and to loader arms of a powered vehicle. The conversion plate adaptor includes an H-shaped frame unit having a pair of vertical leg members and a horizontal cross member. The leg members and cross member are fabricated from tubular stock and the frame unit has a front side and a rear side. The leg members have beveled top and bottom ends adapted for engaging a universal quick attach tool plate. The leg members each have attachment means on the rear side thereof for engaging a loader arm of the powered vehicle.

The locking pin system includes a pair of linear locking pin members, each pin member moveably mounted within a vertical channel interior the horizontal cross member adjacent a vertical leg member. The locking pin members move between a first retracted position and a second extended position into an aperture in a tool plate. Each pin member has a planar plate portion secured at an upper end thereof, exterior the vertical channel. The plate portion is oriented parallel with the pin member's longitudinal axis. Each plate portion has a threaded bolt member mounted perpendicular thereto. A planar, slotted upright member is secured at one end to the frame cross member adjacent each locking pin member and parallel with the pin member's longitudinal axis. Each upright member has a vertical slot therein accepting a pin plate portion's threaded bolt member there through. A locking handle member includes a threaded fitting portion at one end thereof, the threaded fitting engaging each locking pin member's threaded bolt member extending through the upright member's slot. Pivoting the threaded fitting with the handle member draws the pin member's plate portion into contact with the upright member, thereby locking the pin member at a selected position in the vertical channel.

DESCRIPTION OF THE EMBODIMENTS

| Nomenclature | | |
|---|---|---|
| 10 | Conversion Plate Adaptor with Locking Pin Assembly |
| 20 | Frame Unit |
| 25 | Vertical Leg Member |
| 30 | Upper End of Leg Member |
| 35 | Lower End of Leg Member |
| 40 | Cross Member |
| 45 | Attachment Means for Loader Arms |
| 47 | U-Shaped Channel Members |

-continued

Nomenclature

| | |
|---|---|
| 48 | Apertures in Channel Members |
| 50 | Vertical Channels in Cross Member |
| 55 | Interior Surface of Channels |
| 60 | Locking Pin System |
| 70 | Linear Locking Pin Members |
| 75 | Upper End of Pin Member |
| 80 | Lower Chisel End of Pin Member |
| 85 | Planar Plate Portion |
| 90 | Serrated Surface of Plate Portion |
| 95 | Threaded Guide Bolt Member |
| 100 | Slotted Upright Member |
| 105 | Vertical Slot in Upright Member |
| 110 | Serrated Surface of Upright Member |
| 120 | Locking Handle Member |
| 125 | Threaded Fitting Portion of Handle Member |
| 130 | Shroud Member |
| TP | Tool Plate Device |
| P | Pin Aperture in Tool Plate |
| L | Loader Arms |
| A | Longitudinal Axis of Pin Member |

Construction

Figure 1:
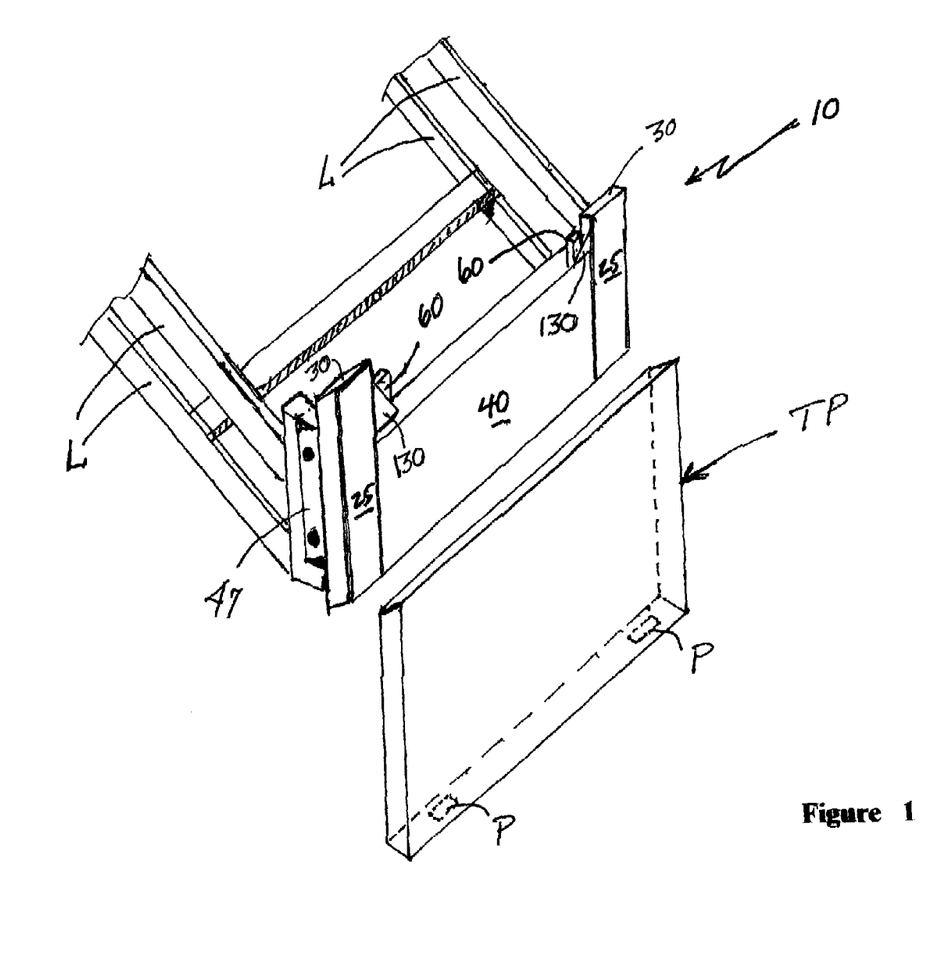
FIG. 1 is a perspective view of the conversion plate adaptor and locking pin system of the present invention connecting a quick attach tool plate with the loader arms of a powered vehicle.

The conversion plate adaptor and locking pin system 10 of the present invention is used for interconnecting a universal quick attach tool plate TP to the loader arms L of a powered vehicle, as depicted in FIG. 1. A variety of tools are available and mounted to a universal quick attach tool plate. Such tools include a plow blade, a power auger, a beam grappling device, a clam shell for timber, or a bucket. Powered vehicles include a tractor, a skid steer, a front end loader, a tracked crawler, as well as others.

Figure 2:
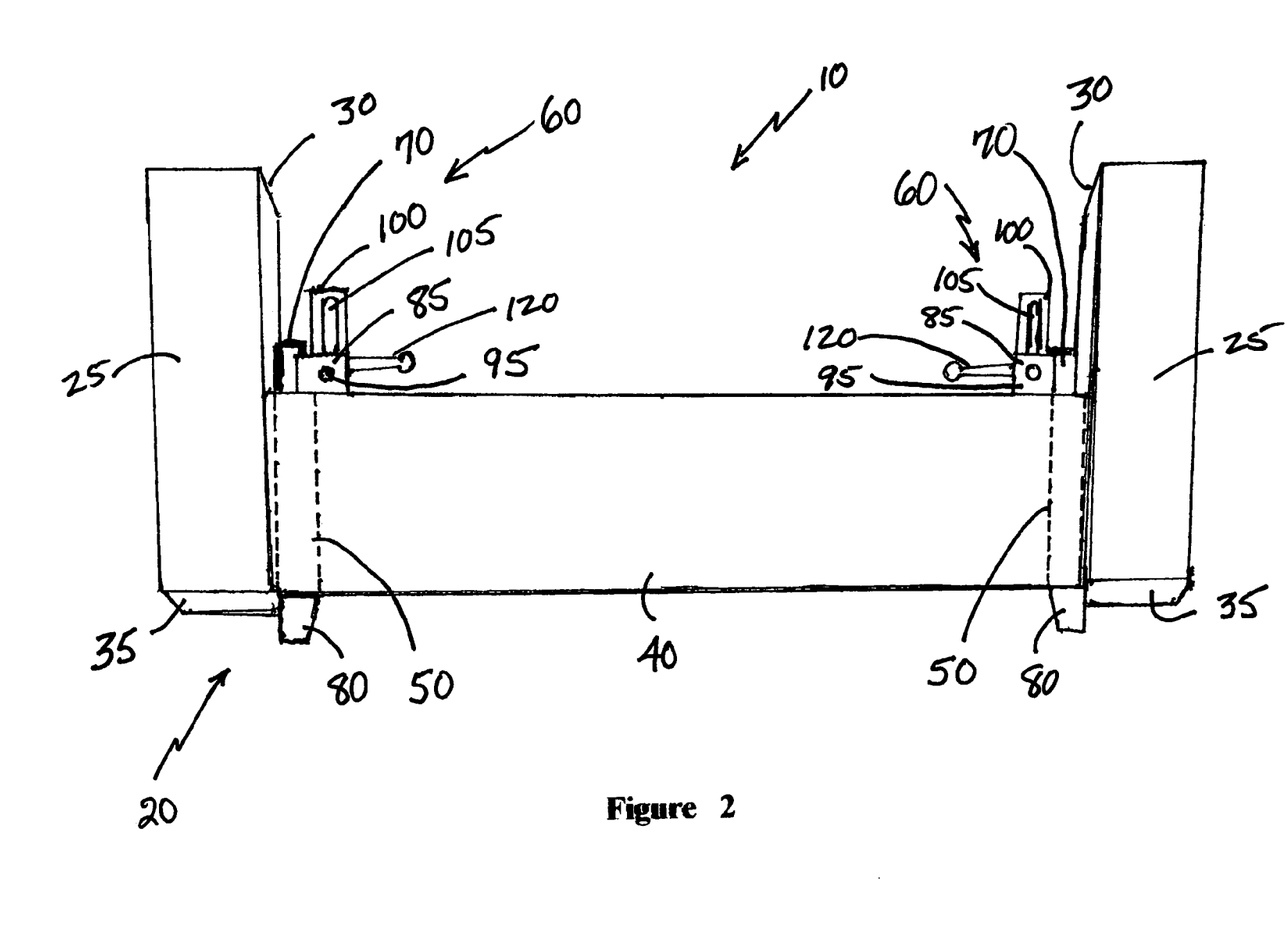
FIG. 2 is a front perspective view of the conversion plate adaptor and locking pin system of the present invention.
Figure 3:
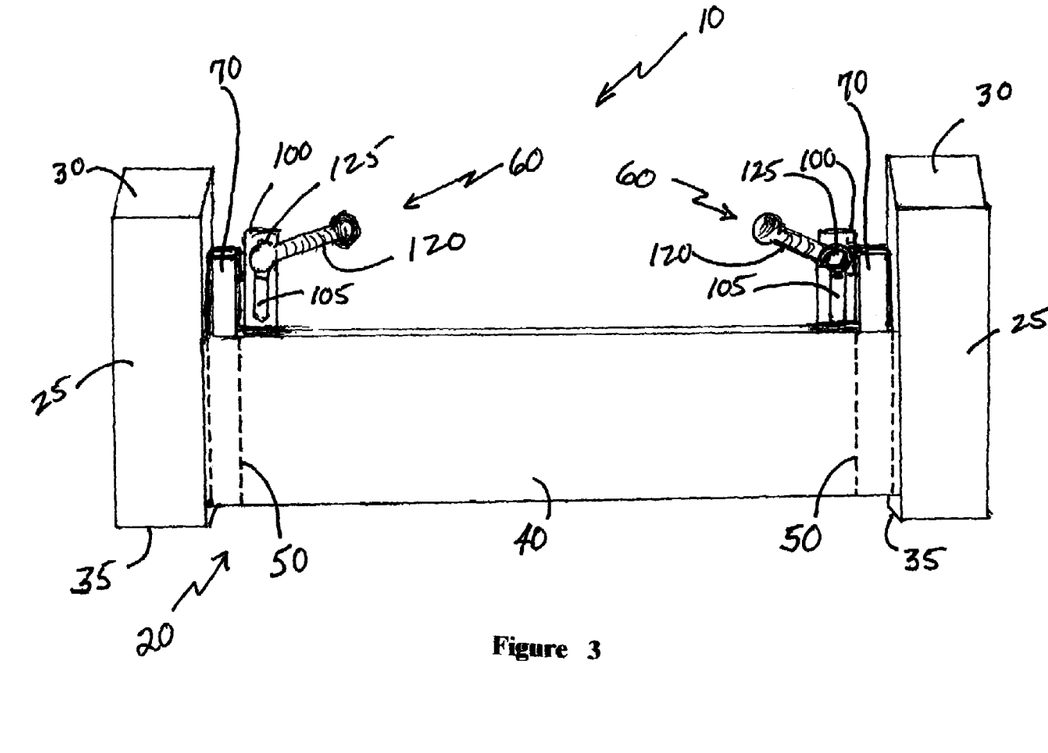
FIG. 3 is a rear perspective view of the conversion plate adaptor and locking pin system of the present invention.

Referring to FIGS. 2 and 3, rear side and front side views of the conversion plate adaptor with locking pin system 10 are shown. The conversion plate adaptor and locking pin system 10 of the present invention includes an H-shaped frame unit 20 having a pair of vertical leg members 25 and a horizontal cross member 40. The leg members 25 each have an upper end 30 and a lower end 35, both of which are beveled. The leg member's upper end 30 has a 45 degree bevel, with the beveled end 30 facing the frame rear side, while the leg member's lower end 35 has a 36 degree bevel with the beveled end 35 facing the frame front side. This provides for secure attachment of the plate adaptor 10 to a universal, quick attach, tool plate TP, as depicted in FIG. 1.

Figure 4:
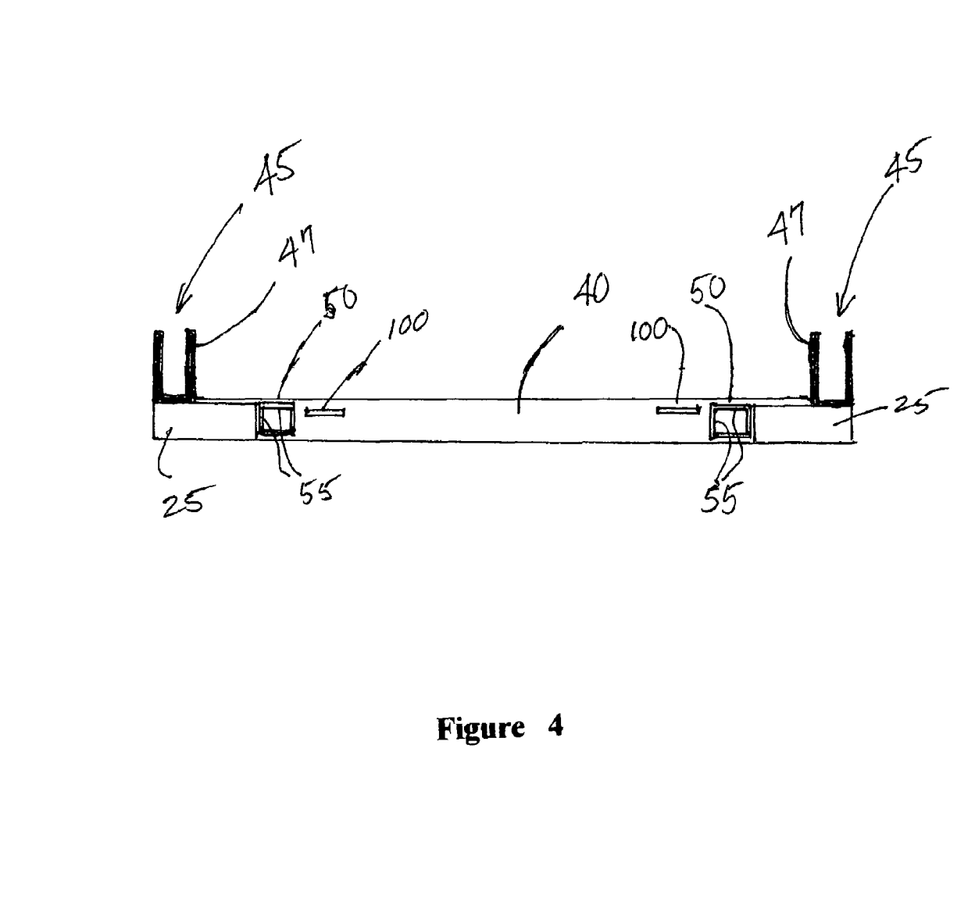
FIG. 4 is a top view of the conversion plate adaptor and locking pin system of the present invention.
Figure 5:
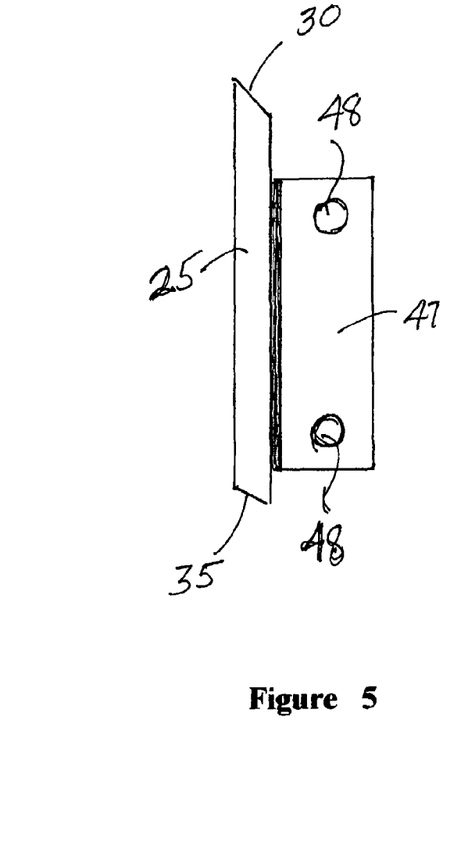
FIG. 5 is a side view of the conversion plate adaptor and locking pin system of the present invention.

The frame leg members 25 and cross member 40 are comprised of tubular stock for strength and rigidity. Preferably, the tubular stock for the leg members 25 has dimensions of 2"×5" and the cross member 40 has dimensions of 2"×8", all tubular stock with ¼" wall thickness. For heavy duty applications, the leg members 25 have dimensions of 3"×5" and the cross member 40 has dimensions of 3"×8", all tubular stock with ⅜" wall thickness. The leg members 25 each have attachment means 45 on the rear side thereof for engaging a loader arm L of the powered vehicle, as illustrated in FIGS. 4 and 5. The attachment means 45 comprises a pair of vertical U-shaped channel members 47, one secured to each leg member 25. The U-shaped channel members 47 include several pairs of aligned apertures 48 for bolting the plate adaptor 10 to the loading arms L of the powered vehicle via the U-shaped channel members 47. Other attachment means 45 are contemplated with equivalent function.

The locking pin system 60 includes a pair of linear locking pin members 70, each pin member 70 moveably mounted within a vertical channel 50 interior the horizontal cross member 40 adjacent a vertical leg member 25. It is preferred that the vertical channels 50 are mutually parallel. Preferably, the pin members 70 are rectangular in cross section with a lower end 80 having a chisel point for insertion into a pin aperture P in the tool plate device TP. Because the cross member 40 is of tubular construction, it is preferred that the vertical channel 50 have a continuous interior surface 55 for maintaining the position of the pin member 70 therein. A continuous interior surface 55 is best achieved by welding a rectangular tube within the vertical channel 50, the rectangular tube having internal dimensions only slightly larger than those of the pin member 70. A top view of the frame unit 20 illustrates the placement of the rectangular tubes that comprise the vertical channels 50 within the cross member 40, as seen in FIG. 4. The upper end 75 of each pin member 70 is accessible from above, allowing the pin member 70 to be struck with a hammer, should the pin member 70 bind within the vertical channel 50 by debris or frozen moisture.

Figure 6:
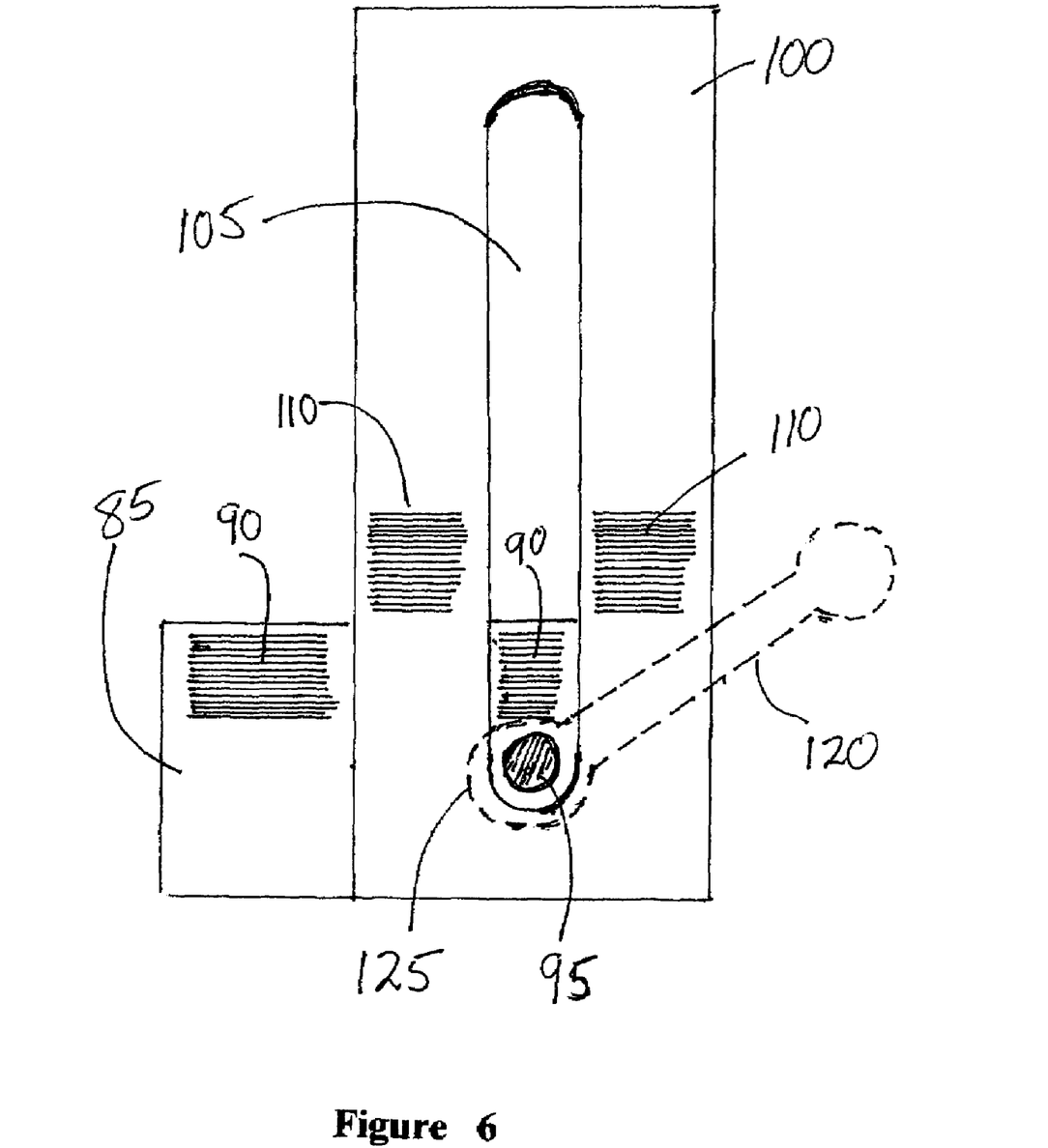
FIG. 6 is a perspective view of the locking pin member and locking handle member of the present invention.

Each pin member has a planar plate portion 85 secured at an upper end 75 of the pin member 70. The plate portion 85 is positioned exterior the vertical channel 50. The plate portion 85 is oriented parallel with the pin member's longitudinal axis A, as illustrated in FIG. 6. Each plate portion 85 has a threaded bolt member 95 mounted perpendicular thereto. The bolt member 95 may be welded to the plate portion 85 or mounted in a threaded aperture in the plate portion 85, as seen in FIG. 6. Preferably, the plate portion 85 includes a serrated surface 90 from which the threaded bolt member 95 protrudes.

Figure 7:
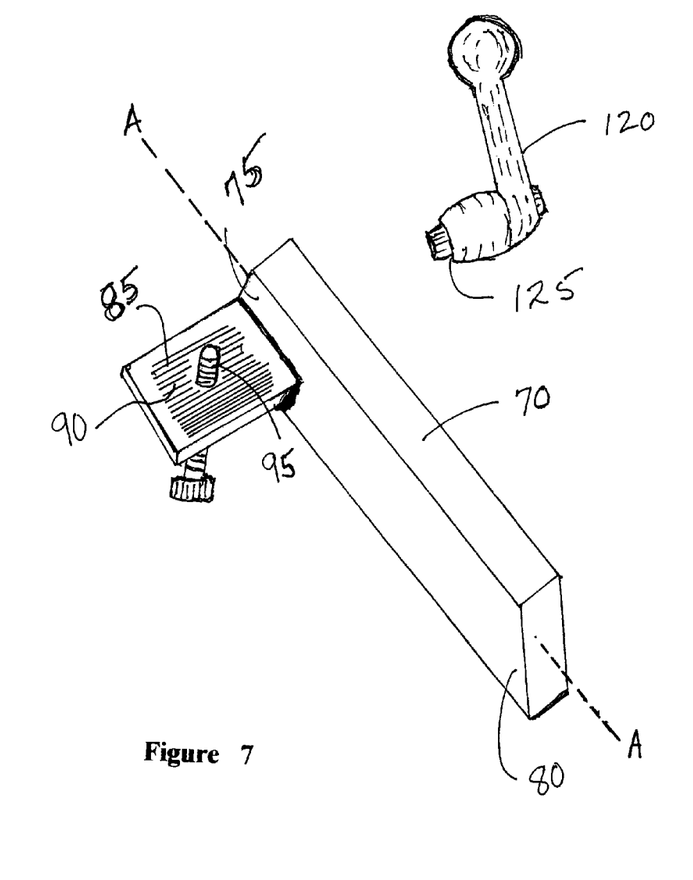
FIG. 7 is a perspective view of the slotted upright member engaging the locking pin member and locking handle member of the present invention.

Referring now to FIG. 7, a planar, slotted upright member 100 is secured at one end to the frame cross member 40 adjacent each locking pin member 70, and adjacent the rear side fo the frame unit 20. The slotted upright member 100 is oriented parallel with the pin member's longitudinal axis with the pin member 70 positioned in the vertical channel 50. Each upright member 100 has a vertical slot 105 therein that accepts one threaded bolt member 95 there through. The vertical slot 105 is sized to allow the bolt member 95 and attached plate portion 85 and pin member 70 to move between a retracted position outside of an aperture P in a tool plate TP and a extended position inside an aperture P in a tool plate TP.

A locking handle member 120 includes a threaded fitting portion 125 at one end thereof. The threaded fitting portion 125 engages each threaded bolt member 95 extending through the upright member's vertical slot 105. Pivoting the threaded fitting portion 125 with the handle member 120 draws the bolt member 95 and attached pin member's plate portion 85 into contact with the upright member 100, thereby locking the pin member 70 at a selected position in the vertical channel 50. Preferably, the slotted upright member 100 includes a serrated surface 110 that contacts the serrated surface 90 of the pin member's plate portion 85, thereby reducing slippage between the two contacting surfaces, as illustrated in FIG. 7, where the handle member 120 is shown in phantom for clarity.

Referring again to FIG. 1, a shroud member 130 is fastened to the frame front side between each frame leg member 25 and an adjacent portion of the frame cross member 40. Each shroud member 130 shields a portion of the locking pin member 50 and associated, slotted upright member 100 from damage during use of the tool plate TP and attached tool.

While the invention has been particularly shown and described with reference to preferred embodiments thereof, it will be understood by those skilled in the art that various changes in form and details may be made therein without departing from the spirit and scope of the invention.

I claim:

1. A locking pin system adapted for connecting a conversion plate adaptor with a universal quick attach tool plate to loader arms of a powered vehicle, the locking pin system comprising:
   a linear locking pin member moveably mounted within a vertical channel interior the conversion plate adaptor to engage said universal quick attach tool plate, the pin member moveable between a retracted position exterior an aperture in said universal quick attach tool plate and an extended position interior an aperture in the tool plate, the pin member having a planar plate portion secured at an upper end thereof exterior the vertical channel, the plate portion oriented parallel with the pin member's longitudinal axis, the plate portion having a threaded bolt member mounted perpendicular thereto;
   a planar, slotted upright member secured at one end to the conversion plate adaptor adjacent the locking pin member and parallel with the pin member's longitudinal axis, the upright member having a vertical slot therein accepting the pin plate portion's threaded bolt member therethrough, the pin member's plate portion including a serrated surface contacting the slotted upright member and the slotted upright member including a serrated surface contacting the serrated surface of the pin member's plate portion; and
   a locking handle member including a threaded fitting portion at one end thereof, the threaded fitting portion engaging the pin plate portion's threaded bolt member extending through the upright member's slot, whereby pivoting the threaded fitting with the handle member draws the pin member's plate portion into contact with the upright member, thereby locking the pin member at a selected position in the vertical channel.

2. The conversion plate adaptor and locking pin system of claim 1, wherein the locking pin member is rectangular in cross section.

3. The conversion plate adaptor and locking pin system of claim 1, wherein the locking pin member includes a chisel point at a lower end thereof.

4. The conversion plate adaptor and locking pin system of claim 1, wherein the vertical channel interior the conversion plate adaptor mounting the locking pin member has continuous interior surfaces.

5. A conversion plate adaptor with locking pin system adapted for interconnecting a universal quick attach tool plate to loader arms of a powered vehicle comprising:
   an H-shaped frame unit having a pair of vertical leg members and a horizontal cross member, the leg members and cross member comprised of tubular stock, the frame unit having a front side and a rear side, the leg members having beveled top and bottom ends adapted for engaging said universal quick attach tool plate, the leg members each having attachment means on the rear side thereof for engaging said loader arm of the powered vehicle; and
   a locking pin system including;
   a pair of linear locking pin members, each pin member moveably mounted within a vertical channel interior the horizontal cross member adjacent a vertical leg member, each pin member moveable between a retracted position exterior an aperture in a tool plate and an extended position interior an aperture in the tool plate, each pin member having a planar plate portion secured at an upper end thereof exterior the vertical channel, the plate portion oriented parallel with the pin member's longitudinal axis, each plate portion having a threaded bolt member mounted perpendicular thereto;
   a planar, slotted upright member secured at one end to the frame cross member adjacent each locking pin member and parallel with the pin member's longitudinal axis, each upright member having a vertical slot therein accepting a pin plate portion's threaded bolt member therethrough; and
   a locking handle member including a threaded fitting portion at one end thereof, the threaded fitting portion engaging each pin plate portion's threaded bolt member extending through the upright member's slot, whereby pivoting the threaded fitting with the handle member draws the pin member's plate portion into contact with the upright member, thereby locking the pin member at a selected position in the vertical channel.

6. The conversion plate adaptor and locking pin system of claim 5, wherein the locking pin members are rectangular in cross section.

7. The conversion plate adaptor and locking pin system of claim 5, wherein each locking pin includes a chisel point at a lower end thereof.

8. The conversion plate adaptor and locking pin system of claim 5, wherein the vertical channels interior the horizontal cross member mounting the locking pin members are mutually parallel.

9. The conversion plate adaptor and locking pin system of claim 5, wherein the vertical channels interior the horizontal cross member mounting the locking pin members have continuous interior surfaces.

10. The conversion plate adaptor and locking pin system of claim 5, wherein the slotted upright member is secured adjacent the rear side of the frame unit.

11. The conversion plate adaptor and locking pin system of claim 5, wherein the pin member's plate portion includes a serrated surface contacting the slotted upright member and the slotted upright member includes a serrated surface contacting the serrated surface of the pin member's plate portion.

12. The conversion plate adaptor and locking pin system of claim 5, wherein the attachment means for engaging the loader arms include a pair of vertically mounted U-shaped members with a plurality of apertures there through, each U-shaped member fastened to one leg member and adapted for attachment to a loading arm of the powered vehicle.

13. The conversion plate adaptor and locking pin system of claim 5, wherein the leg member's upper end bevel is 45 degrees and faces the rear of the frame unit and the leg member's lower end bevel is 36 degrees and faces the front of the frame unit.

14. The conversion plate adaptor and locking pin system of claim 5, further including a shroud member fastened to the frame front side between each frame leg member and the frame cross member, each shroud member shielding a portion of the locking pin system from damage.

15. A conversion plate adaptor with locking pin system adapted for interconnecting a universal quick attach tool plate to loader arms of a powered vehicle comprising:
   an H-shaped frame unit having a pair of vertical leg members and a horizontal cross member, the leg members and cross member comprised of tubular stock, the frame unit having a front side and a rear side, the leg members having beveled top and bottom ends adapted for engaging a universal quick attach tool plate, the leg members each having attachment means on the rear side thereof for engaging a loader arm of the powered vehicle; and a locking pin system including;

a pair of linear, rectangular, locking pin members, each pin member moveably mounted within a vertical channel interior the horizontal cross member adjacent a vertical leg member, each pin member moveable between a retracted position exterior an aperture in a tool plate and an extended position interior an aperture in the tool plate, each pin member having a chisel point lower end and a planar plate portion secured at an upper end thereof exterior the vertical channel, the plate portion oriented parallel with the pin member's longitudinal axis, each plate portion having a threaded bolt member mounted perpendicular thereto;

a planar, slotted upright member secured at one end to the frame cross member adjacent the rear side of the frame, adjacent each locking pin member and parallel with the pin member's longitudinal axis, each upright member having a vertical slot therein accepting a pin plate portion's threaded bolt member therethrough; and a locking handle member including a threaded fitting portion at one end thereof, the threaded fitting portion engaging each pin plate portion's threaded bolt member extending through the upright member's slot, whereby pivoting the threaded fitting with the handle member draws the pin member's plate portion into contact with the upright member, thereby locking the pin member at a selected position in the vertical channel.

16. The conversion plate adaptor and locking pin system of claim 15, wherein the vertical channels interior the horizontal cross member mounting the locking pin members are mutually parallel.

17. The conversion plate adaptor and locking pin system of claim 15, wherein the vertical channels interior the horizontal cross member mounting the locking pin members have continuous interior surfaces.

18. The conversion plate adaptor and locking pin system of claim 15, wherein the pin member's plate portion includes a serrated surface contacting the slotted upright member and the slotted upright member includes a serrated surface contacting the serrated surface of the pin member's plate portion.

19. The conversion plate adaptor and locking pin system of claim 15, wherein the attachment means for engaging the loader arms include a pair of vertically mounted U-shaped members with a plurality of apertures there through, each U-shaped member fastened to one leg member and adapted for attachment to a loading arm of the powered vehicle.

20. The conversion plate adaptor and locking pin system of claim 15, wherein the leg member's upper end bevel is 45 degrees and faces the rear of the frame unit, and the leg member's lower end bevel is 36 degrees and faces the front of the frame unit.

21. The conversion plate adaptor and locking pin system of claim 15, further including a shroud member fastened to the frame front side between each frame leg member and the frame cross member, each shroud member shielding a portion of the locking pin system from damage.

* * * * *